United States Patent [19]

Grahn

[11] Patent Number: 4,502,466

[45] Date of Patent: Mar. 5, 1985

[54] PROTECTIVE SHIELD FOR A SOLAR ENERGY CONCENTRATOR

[75] Inventor: Per G. Grahn, Lund, Sweden

[73] Assignee: United Stirling AB, Malmo, Sweden

[21] Appl. No.: 556,685

[22] Filed: Nov. 30, 1983

[51] Int. Cl.³ .............................. F24J 3/02
[52] U.S. Cl. .................... 126/418; 126/419; 126/451
[58] Field of Search .............. 126/418, 419, 438, 439, 126/451, 440; 49/1, 2, 25; 350/266, 275, 268, 322; 60/641.15

[56] References Cited

U.S. PATENT DOCUMENTS

| | | | |
|---|---|---|---|
| 4,236,383 | 12/1980 | Frosch | 126/419 |
| 4,335,578 | 6/1982 | Osborn et al. | 126/418 |
| 4,432,609 | 2/1984 | Dueker | 126/419 |
| 4,433,672 | 2/1984 | Hale | 126/419 |

Primary Examiner—James C. Yeung
Attorney, Agent, or Firm—Finnegan, Henderson, Farabow, Garrett & Dunner

[57] ABSTRACT

A solar energy concentrator may be provided with a cone made of a stainless steel wire mesh which is movable between two positions—one in which insolation is unaffected and one in which the cone at least partly blocks the insolation.

4 Claims, 2 Drawing Figures

PROTECTIVE SHIELD FOR A SOLAR ENERGY CONCENTRATOR

PRIOR ART DISCLOSURE

Pamphlet: "The Stirling Engine Solar Parabolic Dish System" issued by United Stirling, October 1982.

BACKGROUND OF THE INVENTION

1. Field of the Invention

This invention relates to a protective shield for a solar energy concentrator.

2. Description of the Prior Art

The pamphlet "The Stirling Engine Solar Parabolic Dish System" issued by United Stirling October 1982 shows concentrators of known design located at Edwards Air Force Base in California. Here solar energy is concentrated by a parabolic dish reflector. The heat is focused onto a Stirling Engine, which then converts the heat to mechanical power output to drive an electric generator. The parabolic reflector has a diameter of 11 meters and concentrates a solar energy of about 90 kW.

In case of engine failure causing a stop in the power conversion the energy supply should be stopped immediately in order to avoid damage to the Stirling engine heater head.

On page 6 of the above mentioned pamphlet a solar Stirling engine has been shown comprising two water cooled shutter plates, which may be moved into a position in which they block the insolation through an aperture opening of a receiver cavity.

The cooling system necessary to absorb about 90 kW energy is rather heavy and expensive also because it must be reliable in operation.

SUMMARY OF THE INVENTION

The object of the invention is to provide a protective shield for a solar concentrator which does not need cooling water, which is of low weight and which is reliable and rapid in operation.

This is according to the present invention obtained thereby that it comprises a frustro conical metal net, adapted to be movable between a first position in which it surrounds an aperture opening allowing solar radiation to pass into a cavity and a second position in which it at least partly blocks said opening.

The invention will be described in more detail reference being made to the accompanying drawing.

DETAILED DESCRIPTION OF THE DRAWING

Figure 1:
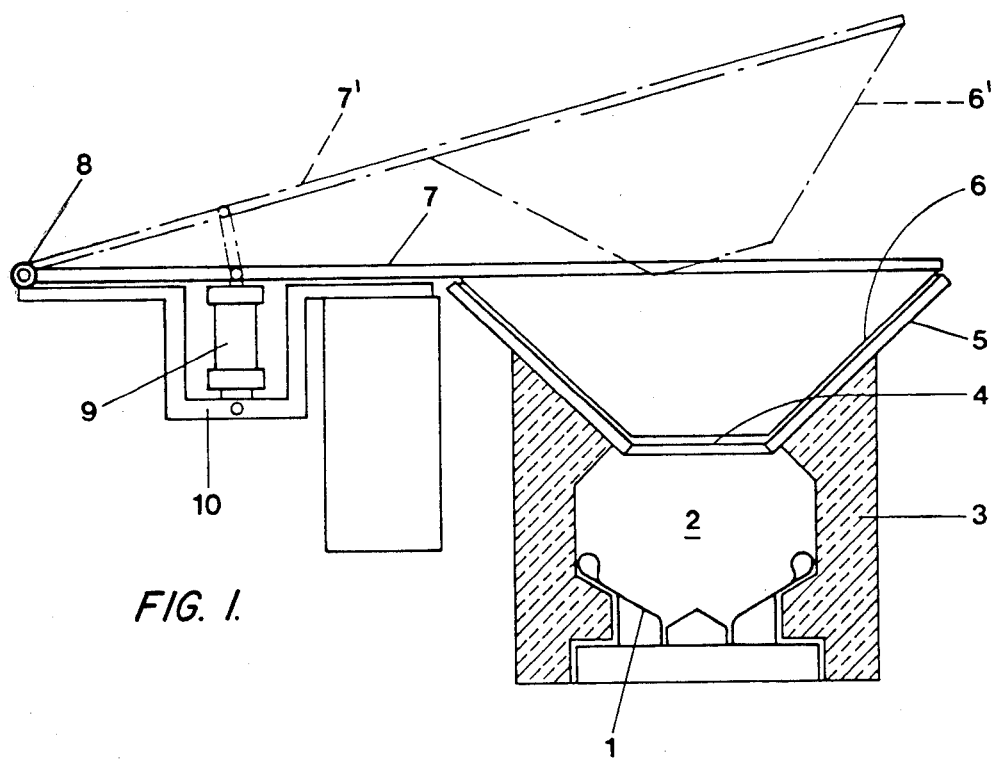
FIG. 1 shows schematically a vertical section through a protective shield according to the invention and FIG. 2 shows the shield of FIG. 1 viewed from above.
Figure 2:
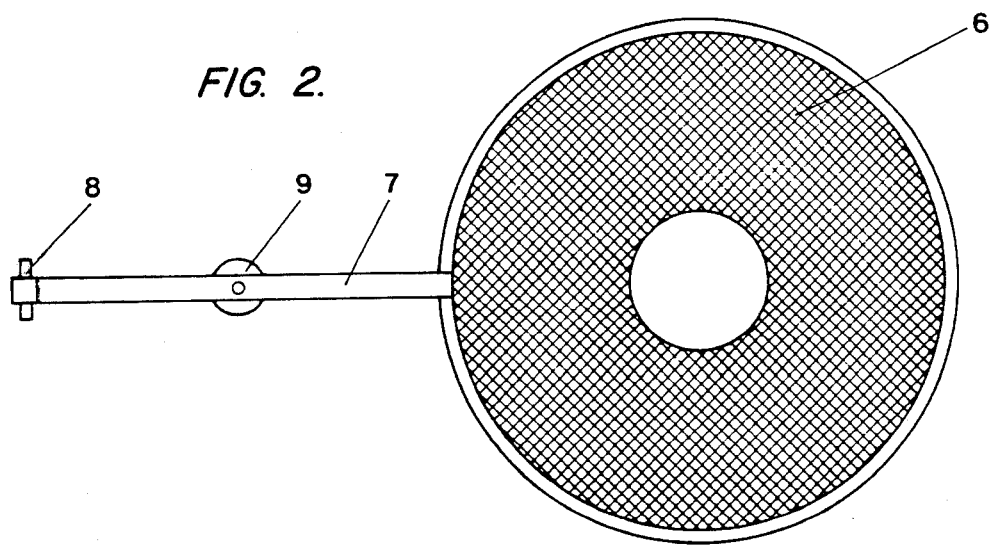

FIG. 1 shows a part of a hot gas engine comprising a heater head 1 consisting of a number of tubes containing hydrogen at a high mean pressure. Said heater head 1 is located in a receiver cavity 2 surrounded by a receiver body 3 having an aperture opening 4 located in the focal area of a parabolic mirror (not shown). A protective cone 5 extends outwardly from the opening 4 and serves to avoid excessive loss of a heat initiated by wind causing cooling air flow through the cavity 2.

A shield comprising a cone 6 mounted on a lever 7 is pivotally mounted by a hinge 8. A pneumatically activated piston cylinder unit 9 is mounted between the lever 7 and a stationary frame 10.

The cone 6 is of frustro-conically shape corresponding to the shape of the cone 5. The cone 6 is made of four stacked layers of a six mesh wire net made of 1.0 mm stainless steel.

The device shown and described will operate as follows:

In the position of the shield shown in fully drawn lines in FIG. 1 the solar radiation may pass through the center of the aperture opening 4 without being influenced by the shield cone 6.

However, if the piston-cylinder unit 9 is activated so as to move the lever 7 and the cone 6 to the position indicated by dash-dotted lines (the cone now being designated by 6' and the lever by 7') the cone 6' will partly block the insolation into the cavity 2.

The solar radiation will heat the wire net cone 6' to about 1000° C. but it will be able to reject about 80 kW without being water cooled.

The energy now passing into the cavity 2 will be about 10 kW or less and will be insufficient to cause damage to the heater head 1.

I claim:

1. A shield for protecting a solar energy concentrator disposed proximate the open apex of a frusto-conical receiver body, said shield comprising:
   (a) a metal net having frusto-conical shape corresponding to the shape of said receiver body; and
   (b) means supporting said net for moving said net between a first position juxtaposed the inside surface of said receiver body and surrounding said open apex to allow insolation of said concentrator and a second position displaced from said receiver body in the path of solar radiation directed to said concentrator to at least partly prevent insolation of said concentrator.

2. The shield as in claim 1, wherein said net comprises a plurality of stacked layers of nets of stainless steel.

3. The shield as in claim 2, wherein each layer of said nets comprise a six mesh net having a wire diameter of 1.0 mm.

4. The shield according to claim 1, wherein said moving means is pivotally supported at a position remote from the axis of said receiver body.

* * * * *